United States Patent
Winzer et al.

(10) Patent No.: US 9,172,461 B2
(45) Date of Patent: Oct. 27, 2015

(54) OPTICAL FIBERS WITH VARIED MODE-DEPENDENT LOSS

(71) Applicants: Peter J. Winzer, Aberdeen, NJ (US);
Kyle C. Guan, Aberdeen, NJ (US);
Emina Soljanin, Green Village, NJ (US)

(72) Inventors: Peter J. Winzer, Aberdeen, NJ (US);
Kyle C. Guan, Aberdeen, NJ (US);
Emina Soljanin, Green Village, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 104 days.

(21) Appl. No.: 13/730,131

(22) Filed: Dec. 28, 2012

(65) Prior Publication Data

US 2014/0186030 A1    Jul. 3, 2014

(51) Int. Cl.
*G02B 6/26* (2006.01)
*H04B 10/07* (2013.01)
*G02B 6/02* (2006.01)

(52) U.S. Cl.
CPC ........ *H04B 10/0705* (2013.01); *G02B 6/02042* (2013.01); *G02B 6/02342* (2013.01)

(58) Field of Classification Search
None
See application file for complete search history.

(56) References Cited

U.S. PATENT DOCUMENTS

| | | | | |
|---|---|---|---|---|
| 4,436,368 | A * | 3/1984 | Keck | 385/127 |
| 8,027,584 | B2 * | 9/2011 | Healey | 398/16 |
| 8,094,977 | B2 * | 1/2012 | Murphy et al. | 385/13 |
| 2006/0153491 | A1 * | 7/2006 | Murphy et al. | 385/13 |
| 2014/0153883 | A1 * | 6/2014 | Mukasa | 385/100 |
| 2014/0212083 | A1 * | 7/2014 | Pare et al. | 385/11 |

OTHER PUBLICATIONS

Corning ClearCurve LBL Optical Fiber Product Information, PI1488, Jul. 2011, 2 pages, Corning Incorporated, Corning, NY.
Corning ClearCurve XB Optical Fiber Product Information, PI1462, Jul. 2011, 2 pages, Corning Incorporated, Corning, NY.
Corning ClearCurve ZBL Optical Fiber Product Information, PI1464, Jul. 2011, 2 pages, Corning Incorporated, Corning, NY.
Corning SMF-28 ULL Optical Fiber With Corning Utra-Low Loss Technology, Product Information, PI1470, Jul. 2011, 2 pages, Corning Incorporated, Corning, NY.

* cited by examiner

*Primary Examiner* — Sung Pak
(74) *Attorney, Agent, or Firm* — Andrew R. Ralston

(57) ABSTRACT

Various embodiments provide for detection of tapping of an optical signal. In one embodiment an optical fiber includes a cladding region and first and second core regions. The first core region has a first core medium having a first mode-dependent loss (MDL) figure of merit. The second core region has a second core medium having a second different MDL figure of merit. Tapping of the optical signal may be determined to occur when the MDL of the first and second optical signals differs by a predetermined threshold value.

20 Claims, 5 Drawing Sheets

OPTICAL FIBERS WITH VARIED MODE-DEPENDENT LOSS

CROSS-REFERENCE TO RELATED APPLICATIONS

This application is related to U.S. patent application Ser. No. 13/730,270, filed on even date herewith and incorporated by reference in its entirety.

TECHNICAL FIELD

The disclosure relates generally to optical communications.

BACKGROUND

Optical communications systems provide data transmission paths that are generally robust to interception of information, e.g. eavesdropping. However, under some circumstances an eavesdropper may tap information from the transmission path, e.g. an optical fiber. Such eavesdropping may be difficult to detect, leaving the intended recipient of the transmission unaware that the confidentiality of the transmission has been compromised.

SUMMARY

One embodiment provides an optical fiber that includes a cladding region, and a plurality of optical cores located within the cladding region. A first core region of the plurality has first mode-dependent loss (MDL) figure of merit (FOM) with a first bend-radius dependence. A second core region of the plurality has a second MDL FOM with a second bend-radius dependence. The first MDL FOM is at least about 50% greater than the second MDL FOM at a given bend radius.

Another embodiment provides a method. The method includes receiving first and second optical signals via respective first and second optical cores of a multi-core optical fiber. A FOM is calculated based on a received power of the first and second optical signals. A change of the FOM is determined after calculating the FOM. It is determined that the first optical signal is tapped when the change exceeds a predetermined threshold.

In another embodiment a system is provided that includes a multi-core optical fiber and an optical transmitter. The multi-core optical fiber comprises first and second optical cores located within an optical cladding. The optical transmitter is configured to respectively transmit first and second optical signals via the first and second optical cores. An optical receiver is configured to receive the first and second optical signals. A tapping detector is configured to determine a FOM based on a received power of the first optical signal and a received power of the second optical signal. The tapping detector is further configured to determine that the first optical signal is tapped when a change of the FOM exceeds a predetermined threshold.

In some of the above-described embodiments the first core region may include a first core medium and/or waveguide design and the second core region may include a second different core medium and/or waveguide design. In some embodiments the first and second core regions comprise first and second nominally identical core media. The first core region is embedded in a cladding having a first effective refractive index (RI), and the second core region is embedded in a cladding having a different second effective RI. In some embodiments the first MDL FOM is at least about 3 dB greater than the second MDL FOM for a 90° bend with a radius of about 10 mm or less. In some embodiments the first core medium has a first induced attenuation for one turn with a radius R, and the second core medium has a second induced attenuation for one turn with the turn radius R. The second attenuation is at least 10 dB greater than the first induced attenuation. In any embodiment the first core region may be configured to propagate a data-bearing optical signal.

Yet another embodiment provides a system that includes an optical transmitter and an optical receiver. The transmitter is configured to transmit an optical signal. The receiver is configured to receive the optical signal. An optical fiber includes an optical core connected to transmit the optical signal between the transmitter and the receiver. The optical fiber has a first loss FOM determined for a straight segment of the optical fiber as a function of a received power of a lower order propagation mode and a received power of a higher order propagation mode. The optical fiber has a second loss FOM determined for a 90° bent segment of the optical fiber with about a 10 mm bend radius as a function of the received power of the lower order propagation mode and the received power of the higher order propagation mode. The first FOM is at least about 10 dB greater than the second FOM. In some embodiments of the system the optical core is one of a plurality of optical cores of the optical fiber. In some embodiments the MDL is at least about 13 dB with a bend radius of the optical fiber of about 5 mm or less. In some embodiments the optical signal is configured to transmit modulated data.

Additional aspects of the invention will be set forth, in part, in the detailed description, figures and any claims which follow, and in part will be derived from the detailed description, or can be learned by practice of the invention. It is to be understood that both the foregoing general description and the following detailed description are examples and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The disclosure is directed to, e.g. methods and systems that provide improved security of optical communications. The inventors have discovered that interception of optical data may be detected by employing an optical transmission medium, e.g. an optical fiber, supporting the transmission of at least two optical spatial modes, wherein the modes each have a mode-dependent loss (MDL) that depends differently on a bend radius of the fiber. When a potential eavesdropper attempts to tap an optical signal propagating in the fiber, a change of the differential MDL of the two cores may be detected, alerting the sender or intended recipient to the data interception attempt.

Figure 1:
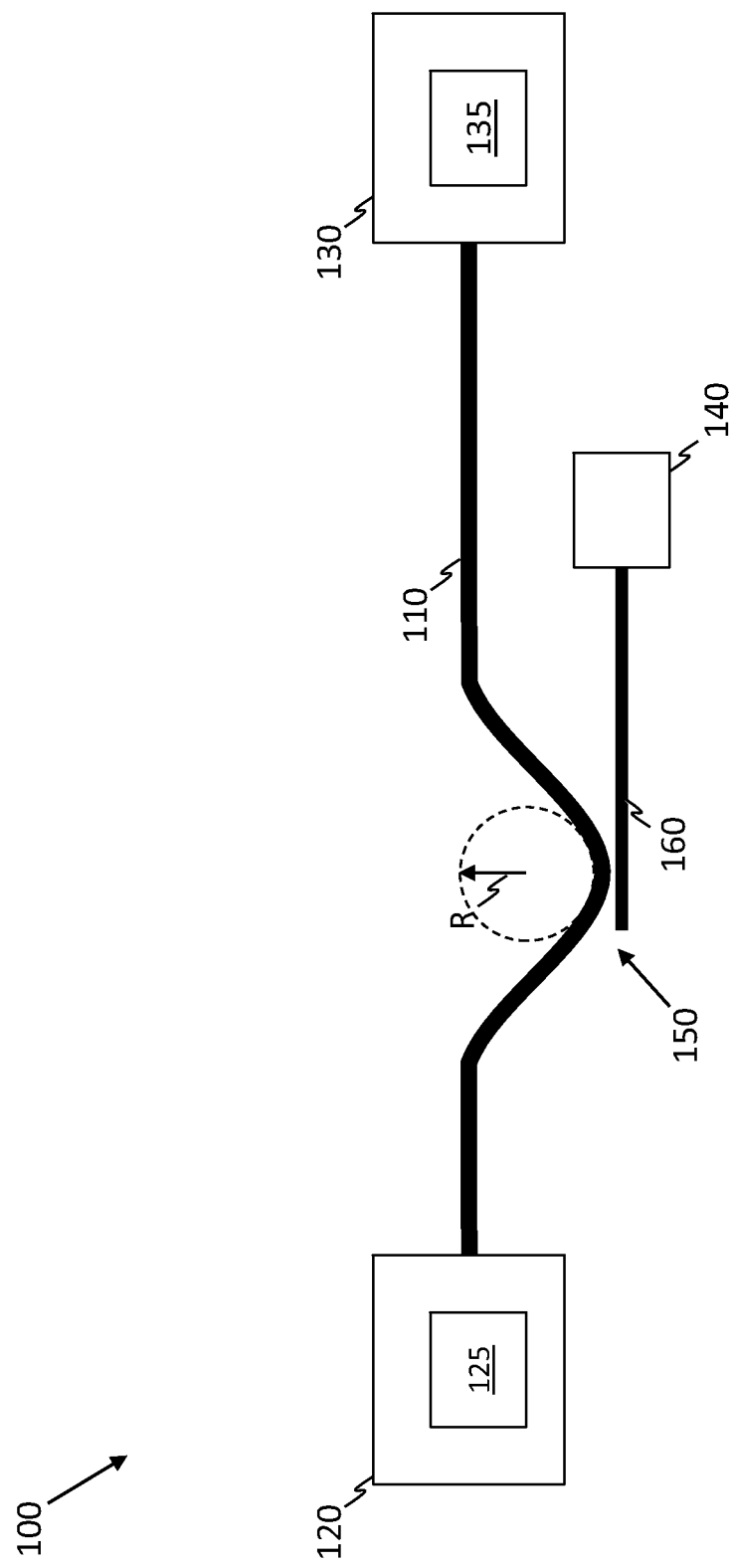
FIG. 1 illustrates one embodiment of a system, e.g. for transmitting an optical signal via an optical fiber capable of supporting a spatially multiplexed optical signal, e.g., a multi-core optical fiber (MCF) or a multi-mode fiber, while detecting the presence of an eavesdropper.

Referring first to FIG. 1, a system 100 is illustrated that is configured according to one example embodiment of the invention. The system 100 includes an optical fiber 110, a transmitter 120 and a receiver 130. As described further below the optical fiber 110 may be a multi-mode optical fiber (MMF), e.g. a few-mode fiber (FMF), or a multi-core optical fiber (MCF). The transmitter 120 is configured to transmit a plurality of optical signals, e.g. a first and a second optical signal, via corresponding first and second optical modes or cores of the fiber 110. The description of various embodiments may refer to two modes or two cores, but embodiments are not limited thereto. The transmitter 120 includes a modulator 125 that may modulate one or both of the optical signals with data, wherein the modulation format is not limited to any particular type.

An eavesdropping receiver 140 may tap energy from one or both of the modes or cores of the optical fiber 110 in an attempt to intercept a portion of the transmitted data. The eavesdropping receiver 140 may produce a bend 150 in the fiber 110, the bend 150 having a radius R. When R is sufficiently small, light may couple from one or both cores of the fiber 110 to the eavesdropping receiver 140, either through a tap fiber 160 or through a free-space optics arrangement.

The receiver 130 includes a tapping detector 135, sometimes referred to briefly as the detector 135. As described further below, the tapping detector 135 is configured to determine a FOM associated with the diversion of optical energy from the fiber 110 to the fiber 160.

In one embodiment, and as described further below, when the fiber 110 is a MCF, the FOM may be a ratio or a difference between the optical power received via two or more optical cores within the fiber 110. In another embodiment, and as described further below, when the fiber 110 is a MMF the FOM may be a ratio or a difference between the optical power received via two or more propagation modes of the fiber 110. The FOM may be expressed in any appropriate fashion. Without limitation thereto, the FOM may be expressed herein in dB. Those skilled in the pertinent art are familiar with equivalent expressions of a ratio or difference. Moreover, embodiments are not limited to the FOMs described above. Any FOM is within the scope of the disclosure that captures a relative change of the MDL between two or more optical signals transmitted via a same optical fiber. In some cases the FOM may be specified at a transmission wavelength of the transmitted optical signal, e.g. 1550 nm. The FOM may further be specified as a function of the bend radius R, e.g. 10 mm.

Figure 2:
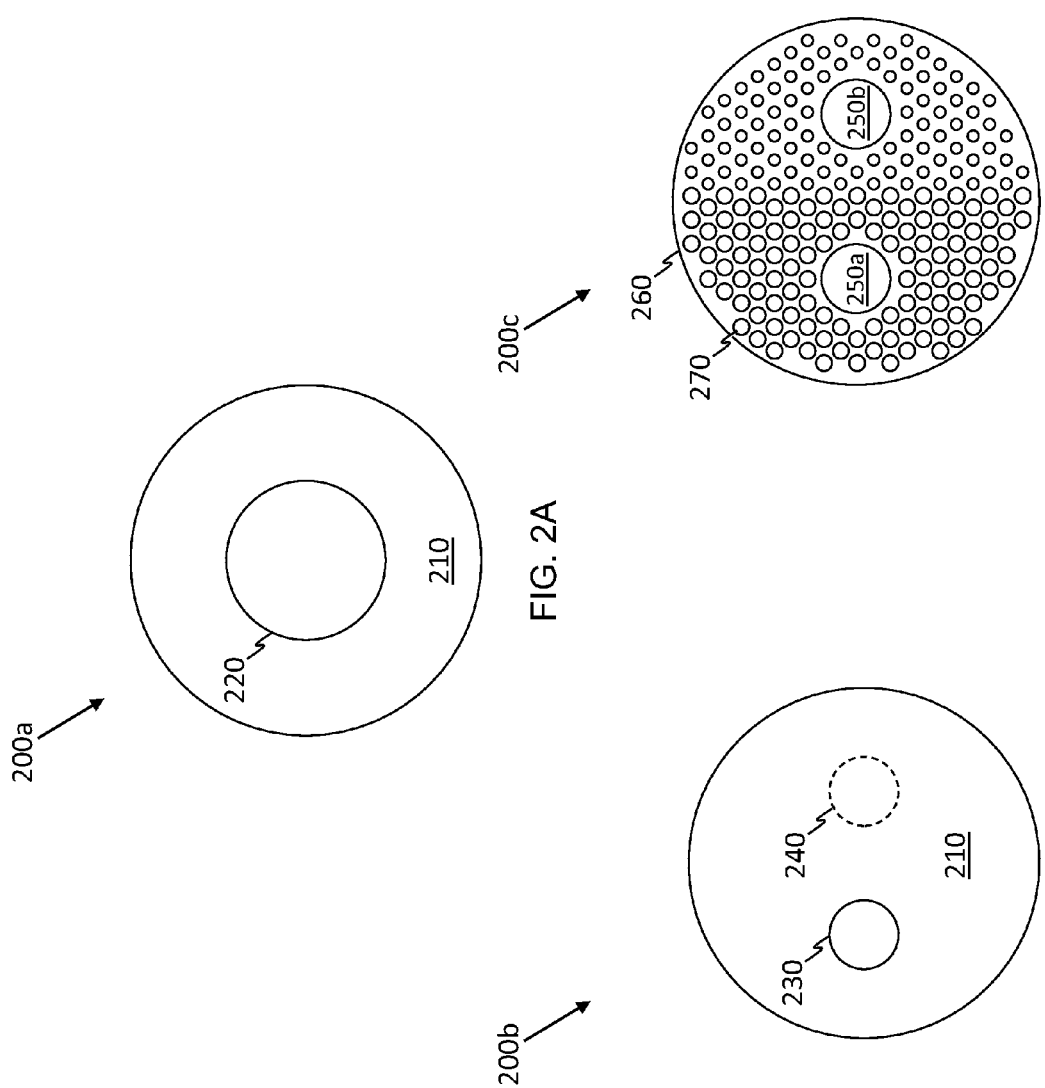
FIGS. 2A-2C respectively illustrate sectional views a optical fibers; a single-core, e.g. multi-mode, fiber; a MCF having two optical cores comprising different optical media types; and a MCF having two optical cores comprising similar optical media types each embedded in a cladding region with a different void density.

FIGS. 2A-2C illustrate aspects of the optical fiber 110 in three nonlimiting embodiments. In FIG. 2A an embodiment of the fiber 110, designated fiber 200a, is illustrated as a MMF. The fiber 200a includes a cladding region 210 and a core region 220. The core region 220 supports at least two propagation modes, and in some embodiments preferably supports four propagation modes, e.g. LP01, LP11, LP21, and LP02. In one embodiment the fiber 200a may be designed such that at least one higher-order mode is operated close to cut-off, which may lead to an intentionally high bending loss for that mode, with a MDL value of at least 10 dB higher than the next-lower mode when bent using a radius of 10 mm or less.

Figure 3:
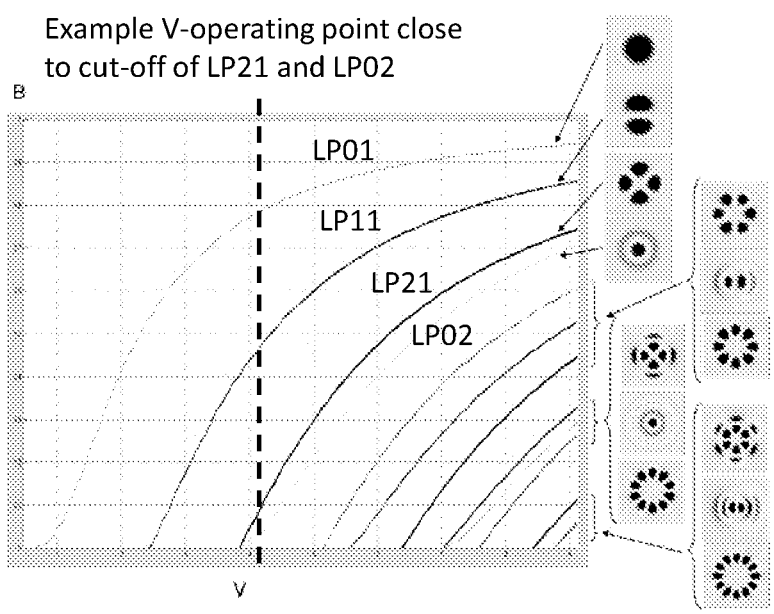
FIG. 3 illustrates characteristics of normalized propagation constant versus normalized frequency for several propagation modes of a multi-mode optical fiber.

FIG. 3, for example, illustrates the normalized propagation constant B versus the normalized frequency V of several modes of an example MMF. At the illustrated example value of V, the LP21 and LP02 modes are operating close to cutoff, e.g. B≈0.1. As a result the MDL upon bending is larger for LP21 and LP02 than for LP01 and LP11, which allows for detection of a bend using the FOM discussed above. The detector 135 includes optical detectors to determine a received power from the fiber 110. The detector 135 may compute and monitor this FOM and issue an alarm when the FOM changes by a predetermined threshold, e.g. at least 3 dB (~50%). To provide greater discrimination between eavesdropping and bending of the fiber 200a unrelated to eavesdropping the threshold may be greater, e.g. about 10 dB.

In FIG. 2B an embodiment of the fiber 110, designated fiber 200b includes two core regions 230 and 240. The fiber 200b may therefore be referred to as a MCF 200b. While the two core regions 230, 240 are shown, the MCF 200b is not limited to any particular number of two or more core regions. The MCF 200b may be designed such that one core, e.g. the core 230, has a high bending tolerance while another core, e.g. the core 240, has a low bending tolerance. This can be achieved by using, e.g. for the core 230 a core medium and/or waveguide design with an index profile that has a low bending loss, and for the core 240 a core medium and/or waveguide design with an index profile that has a high bending loss. A nonlimiting example of a low-loss core medium is provided by, e.g. ClearCurve® ZBL optical fiber, manufactured by Corning Inc., Corning N.Y., 14831, USA. A nonlimiting example of a high-loss core medium is provided by, e.g. SMF-28® ULL optical fiber, also manufactured by Corning, Inc. Those skilled in the art are capable of forming a MCF having core regions with properties exemplified by these example fiber media.

"Waveguide design" may include varying the RI (or effective RI) of a fiber core and/or fiber cladding to provide a fiber core with regions of different RI, and/or a fiber cladding with regions of different RI. For the purpose of this discussion and the claims, a core region may be regarded as having a particular bending loss, e.g. mode dependent loss, if the loss is based on the properties of the core, the properties of the cladding near the core, or both.

Without limitation by example, the ClearCurve® ZBL optical fiber is characterized by, inter alia, an induced attenuation no greater than about 0.1 dB at 1550 nm for five turns around a mandrel having a radius of about 5 mm. In another nonlimiting example, the SMF-28® ULL optical fiber is characterized by, inter alia, an induced attenuation no greater than about 0.1 dB at 1550 nm for one turn around a mandrel having a radius of about 32 mm. It is therefore expected that for a 90° bend with a same bend radius, the SMF-28® ULL optical fiber will have an induced attenuation substantially greater than that of the ClearCurve® ZBL fiber. Thus the SMF-28® ULL fiber is regarded as being less bend-tolerant than the ClearCurve® ZBL optical fiber.

In FIG. 2C, an embodiment of the fiber 110, designated fiber 200c, includes two cores 250a and 250b that may be, but are not limited to being, nominally identical materials. A cladding 260 includes voids 270. The core 250a is embedded in a portion of the cladding 260 in which the voids 270 occupy a greater proportion of the cladding 260 volume, while the core 250b is embedded in a portion of the cladding 260 in which the voids 270 occupy a lesser proportion of the cladding 260 volume. In other words, the cladding 260 is less dense around the core 250a, and more dense around the core 250b. Thus light may propagate differently within the cores 250a and 250b. In particular, the core 250a may have a different bend sensitivity than the core 250b. The use of voids in the cladding 260 is one example of waveguide design. The portions of the cladding 260 having different void densities may also have different effective refractive indexes, thereby providing different propagation characteristics of optical signals propagating within the cores 250a, 250b. "Effective refractive index" may refer to the RI experienced by an optical signal. In the present example, the effective RI may be an average of the RI of the cladding medium and the RI of the voids ($\approx 1$), each weighted by its volume fraction in the cladding 260.

Embodiments are not limited to any particular number of modes used to transmit information in a using a multi-mode single-core optical fiber, e.g. fibers described by FIG. 2A. Similarly, while the examples of FIGS. 2B and 2C illustrate two optical cores, embodiments are not limited to any particular number of cores. Multi-core optical fibers have been manufactured with more than two optical cores, e.g. more than 100 cores. The principles described herein may be applicable to any such suitably configured optical fiber.

In some cases the bend radius R may need to be reduced below a threshold value to result in a reliably detectable metric. It is expected that an eavesdropper will also need to reduce the bend radius to or below the threshold value to effectively tap the optical signal. In some cases the threshold value R is expected to be about 20 mm, but for some low-loss optical core media, may be about 10 mm or even about 5 mm.

Figure 4:
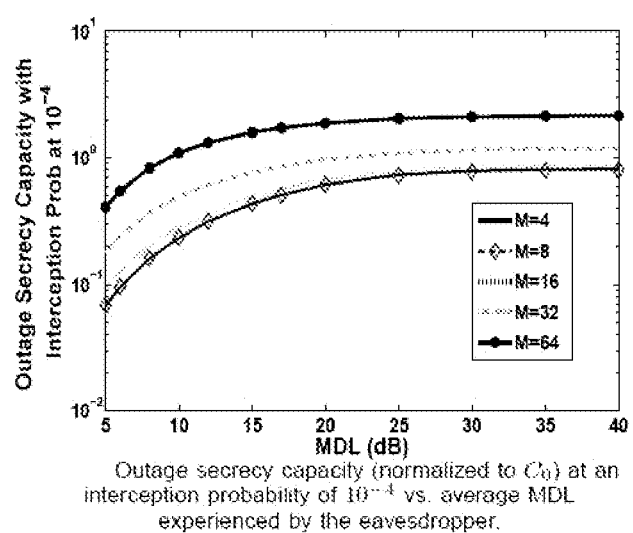
FIG. 4 illustrates several outage secrecy capacity characteristics for a multimode or multi-core optical fiber as a function of mode-dependent loss.

FIG. 4 illustrates a metric "Outage Secrecy Capacity" (normalized to the capacity of one fiber mode $C_o$) versus MDL in dB for optical fibers supporting M=4, 8, 16, 32 and 64 modes.) This figure illustrates a related benefit of high MDL in one or more cores of the optical fiber 110. As the MDL increases, the secrecy capacity of the communication link between the transmitter 120 and the receiver 130 increase. For example, for M=4, the secrecy capacity increases from about 8% at MDL=0 to about 50% of the capacity of a single mode at MDL=40. For M=64 over the same MDL range the secrecy capacity increases from about 40% to about 200% of the capacity of a single mode. These data indicate that the eavesdropper is less able to intercept the transmitted data by forming the bend 150 as the MDL of the fiber 110 core increases.

The optical fibers 200a, 200b and 200c, and other fibers within the scope of the disclosure, may be formed by techniques known to those skilled in the optical arts. While such techniques may be conventional, the configuration of the resulting MCF is a significant departure from conventional practice. Typically optical system design objectives include low MDL in a single-core fiber, and low MDL and/or nominally identical optical properties of the cores of the MCF. In contrast, some embodiments described herein provide single-core fibers having intentionally large MDL, e.g. >$\approx$10 dB, for a 90° bend with a radius of $\approx$10 mm or less. Other embodiments provide MCFs with cores having MDLs that are dissimilar to the extent that the MDL differences of the cores may be detected and quantified when the fiber 110 is bent about 90° with a bend radius of about 10 mm or less. These unconventional features of the described embodiments provides a previously unavailable or improved ability to characterize an optical fiber during operation, e.g. to detect eavesdropping, as well as an improved ability to increase the secrecy capacity of the transmission medium.

Figure 5:
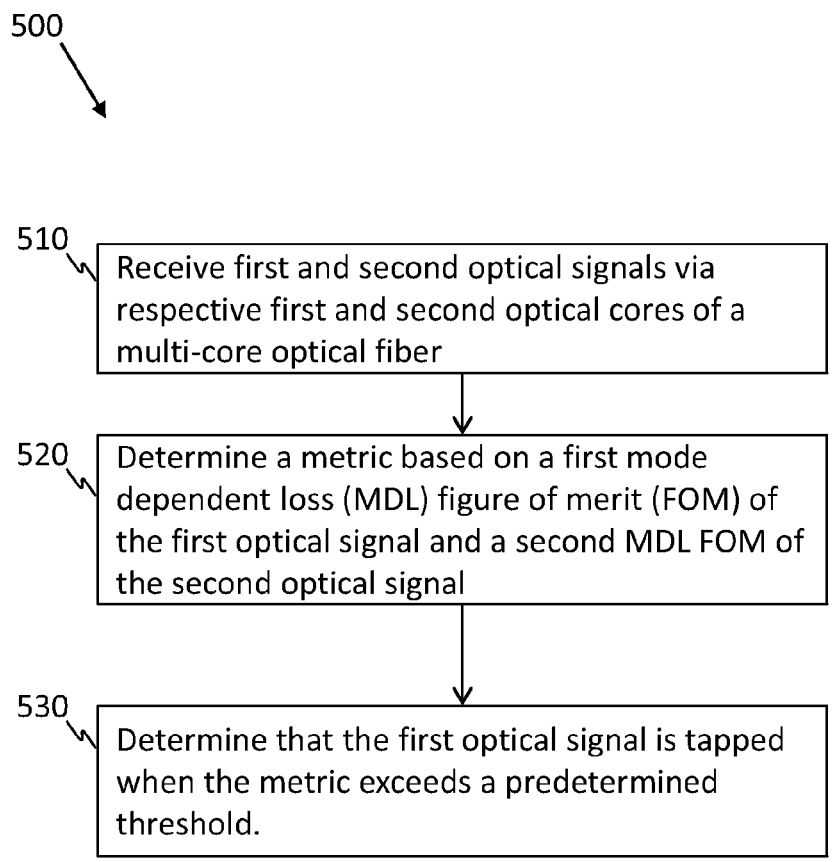
FIG. 5 presents a method, e.g. for operating an optical communication system.

FIG. 5 illustrates a method 500, e.g. for operating an optical communication system, that may employ elements of the previously described embodiments. In a step 510 first and second optical signals are received via respective first and second optical cores of a MCF, e.g. the cores 220 and 230 of the MCF 210. In a step 520 a metric, e.g. a difference or a ratio, is determined based on a first MDL of the first optical core and a second MDL of the second optical core. In a step 530 the presence of a presumed eavesdropper is determined when the metric exceeds a predetermined threshold. For example, when the metric is a difference expressed in dB between the MDL of the optical cores 220 and 230, the threshold may be about 10 dB. For the purpose of this disclosure and the claims, a metric that is diminished below a predetermined threshold as a result of the bend-induced change of MDL is considered equivalent to described example of exceeding a predetermined threshold.

In some embodiments of the method 500, the first core medium may have an induced attenuation of about 0.1 dB at 1550 nm for one turn around a mandrel having a radius of about 32 mm, and the second core medium may have an induced attenuation of about 0.1 dB at 1550 nm for five turns around a mandrel having a radius of about 5 mm. In some embodiments a cladding region of the multi-core optical fiber includes voids. In any embodiment of the method 500 the transmitter may be configured to modulate the first or second optical signal with data.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An optical fiber, comprising:
    a cladding region and a plurality of core regions;
    a first core region of said plurality having a first mode-dependent loss (MDL) figure of merit (FOM) with a first bend-radius dependence; and
    a second core region of said plurality having a second MDL FOM with a second different bend-radius dependence, said first MDL FOM being at least about 50% greater than said second MDL FOM at a given bend radius.

2. The optical fiber of claim 1, wherein said first core region comprises a first core medium and said second core region comprises a second different core medium.

3. The optical fiber of claim 1, wherein said first and second core regions comprise first and second nominally identical core media, and said first core region is embedded in a cladding having a first effective refractive index, and said second core region is embedded in a cladding having a different second effective refractive index.

4. The optical fiber of claim 1, wherein said first and second FOMs are dB of loss, and said first MDL FOM is at least about 3 dB greater than said second MDL FOM for a 90° bend with a radius of about 10 mm or less.

5. The optical fiber of claim 1, wherein said first core medium has a first induced attenuation for one turn with a radius R, and said second core medium has a second induced attenuation for one turn with the turn radius R, the second attenuation being at least 10 dB greater than the first induced attenuation.

6. The optical fiber of claim 1, wherein said first core region is configured to propagate a data-bearing optical signal.

7. A method, comprising:
    receiving first and second optical signals via respective first and second optical cores of a multi-core optical fiber;

calculating a figure of merit (FOM) based on a received power of said first and second optical signals;

determining a change of said FOM after said calculating based on a first power change of said first optical signal and a second different power change of said second optical signal; and determining that said first optical signal is tapped when said change exceeds a predetermined threshold.

8. The method of claim 7, wherein said first core medium has an induced attenuation of a fundamental mode of about 0.1 dB or less at 1550 nm optical wavelength for 5 turns around a 5 mm mandrel.

9. The method of claim 7, wherein a cladding region of said multi-core optical fiber includes a first portion having a first effective refractive index and a second portion having a different second refractive index.

10. The method of claim 7, wherein said predetermined threshold is at least about 10 dB.

11. The method of claim 7, wherein said first optical signal is configured to propagate a data-bearing optical signal.

12. A system, comprising:

a multi-core optical fiber comprising first and second optical cores located within an optical cladding;

an optical transmitter configured to respectively transmit first and second optical signals via said first and second optical cores;

an optical receiver configured to receive said first and second optical signals; and a tapping detector configured to determine a FOM based on a first change of received power of said first optical signal and a second different change of received power of said second optical signal, and to determine that said first optical signal is tapped when a change of said FOM exceeds a predetermined threshold.

13. The system of claim 12, wherein said first core medium has a first induced attenuation for one turn with a radius R, and said second core medium has a second induced attenuation for one turn with the turn radius R, the second attenuation being at least 10 dB greater than the first induced attenuation.

14. The system of claim 12, wherein a cladding region of said multi-core optical fiber includes a first portion having a first effective refractive index and a second portion having a different second refractive index.

15. The system of claim 12, wherein said predetermined threshold is at least about 10 dB.

16. The system of claim 12, wherein said optical transmitter is configured to modulate said first optical signal with data.

17. A system, comprising:

an optical transmitter configured to transmit an optical signal;

an optical receiver configured to receive said optical signal; and an optical fiber comprising an optical core connected to transmit said optical signal between said transmitter and said receiver, said optical fiber having a first loss figure of merit (FOM) determined for a straight segment of said optical fiber as a function of a received power of a lower order propagation mode and a received power of a higher order propagation mode, said optical fiber having a second loss FOM determined for a 90° bent segment of said optical fiber with about a 10 mm bend radius as a function of said received power of said lower order propagation mode and said received power of said higher order propagation mode, said first FOM being at least about 10 dB greater than said second FOM.

18. The system of claim 17, wherein said optical core is one of a plurality of optical cores of said optical fiber.

19. The system of claim 17, wherein said optical fiber has a mode dependent loss of at least about 13 dB with a bend radius of said optical fiber of about 5 mm or less.

20. The system of claim 17, wherein said optical signal is configured to transmit modulated data.

\* \* \* \* \*